United States Patent [19]

Abramitis

[11] 3,857,879

[45] Dec. 31, 1974

[54] AMINE SALTS OF SUBSTITUTED SUCCINAMIC ACIDS

[76] Inventor: Walter W. Abramitis, 1315 59th St., Downers Grove, Ill. 60515

[22] Filed: Oct. 5, 1970

[21] Appl. No.: 78,240

[52] U.S. Cl..... 260/501.11, 260/534 R, 260/561 R, 260/561 A, 260/561 S, 71/76, 71/77, 71/113, 71/118
[51] Int. Cl. ........................................ C07c 103/14
[58] Field of Search .................... 260/501.11, 534 R

[56] References Cited
UNITED STATES PATENTS

| | | | |
|---|---|---|---|
| 3,276,856 | 10/1966 | Esposito | 260/501.16 X |
| 3,345,157 | 10/1967 | Richter | 260/501.16 X |
| 3,544,467 | 12/1970 | Kautsky | 252/51.5 |
| 3,578,679 | 5/1971 | Caruso et al. | 260/501.11 X |

OTHER PUBLICATIONS

Kuiper, Chemical Abstracts, Vol. 67, col. 99099g.
Stuart, Chemical Abstracts, Vol. 57, Col. 10275, (1962).
Chemical Abstracts, 7th Collective Index, Vols. 56–65, p. 21,888 (1970).

*Primary Examiner*—Leon Zitver
*Assistant Examiner*—Michael W. Glynn
*Attorney, Agent, or Firm*—Francis W. young

[57] ABSTRACT

Plant growth regulatory agents which are nitrogen derivatives of polybasic aliphatic acids, such as diamides and amido ammonium salts, and process for regulation of plant growth, particularly dwarfing and growth stimulation by application of such nitrogen derivatives.

4 Claims, No Drawings

AMINE SALTS OF SUBSTITUTED SUCCINAMIC ACIDS

CROSS REFERENCE TO RELATED APPLICATION

This application is a continuation-in-part of my pending earlier filed application Ser. No. 687,438 filed Dec. 4, 1967, now abandoned.

BACKGROUND OF INVENTION

It is often desirable to retard normal growth in various trees and plants to obtain dwarfed, mature trees and plants. Such dwarfing is frequently desirable for ease of harvesting desired portions of the plant, and in many species dwarfing produces earlier maturity and increased crop yields. One previous way of obtaining desired dwarfing was to select smaller breed varieties of plants. Also, chemical sprays have been used in the past, such as triiodobenzoic acid, certain quaternary ammonium chlorides, and hydrazides, but these chemicals have not always proven entirely satisfactory.

It is also often desirable to stimulate plant growth which increases flower, fruit, seed set, and production.

DESCRIPTION OF THE INVENTION

I have found that excellent growth regulation of plants and trees may be obtained by application of certain nitrogen derivatives of polybasic aliphatic acids to growing plants or by application to seeds prior to planting. Depending upon the amount of chemical applied and the time of the plant life cycle at which the chemical is applied, the regulatory effect may be stimulation or dwarfing. The compounds useful for the process of my invention may generally be described as the substituted diamides and amido ammonium salts of aliphatic polybasic acids. The parent acid structure may also be substituted with hydrocarbon radicals, carboxy, hydroxy, and halogen groups.

Especially suitable compounds for use in regulating plant growth have the formula:

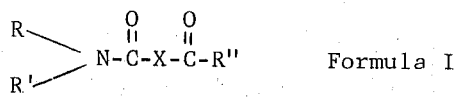  Formula I wherein R is selected from the group consisting of H and aliphatic hydrocarbon radicals having from 1 to about 18 carbon atoms, and R' is an aliphatic hydrocarbon radical having from 1 to about 18 carbon atoms; R'' is selected from the group consisting of

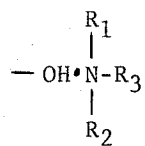

wherein $R_1$ is selected from the group consisting of aliphatic hydrocarbon radicals having from 1 to about 4 carbon atoms, $(CH_2CH_2O)_mH$, and

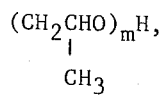

$R_2$ is selected from the group consisting of aliphatic hydrocarbon radicals from 1 to about 4 carbon atoms, $(CH_2CH_2O)_nH$, and

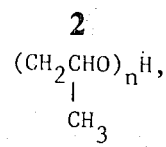

wherein $m$ and $n$ are integers from 1 to about 15, and $R_3$ is an aliphatic hydrocarbon radical having from 8 to 22 carbon atoms, and

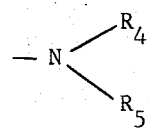

wherein $R_4$ is selected from the group consisting of H and aliphatic hydrocarbon radicals having from 1 to 18 carbon atoms and $R_5$ is an aliphatic hydrocarbon radical having from 1 to 18 carbon atoms; and wherein X is a bivalent aliphatic hydrocarbon radical having from 1 to 22 carbon atoms and may be substituted with radicals selected from the group consisting of carboxy, hydroxy, and halogen.

It is observed that when the bivalent radical X is substituted with carboxy and/or hydroxy functions, the parent molecular structure represents substituted acids such as tartaric and citric acids. The bivalent radical X may be saturated such as alkylene or unsaturated representing parent acids such as fumaric and maleic acids. Also, the bivalent radical X may be branched chain alkylene such as alkyl succinic acid, or halogen substituted, chloro being preferred. A preferred subclass of compounds exists when X is an alkylene radical having from 1 to 22 carbon atoms.

In a preferred embodiment, the above compounds have R, R', $R_4$ and $R_5$ when aliphatic hydrocarbon radicals each selected from the group consisting of alkyl radicals of 1 to 18 carbon atoms and alkenyl radicals of 2 to 18 carbon atoms.

One preferred sub-class of compounds coming within my invention includes nitrogen derivatives of succinamic acid, particularly the diamides and amine salts. The alkylene group of the succinamic acid may be substituted with an alkyl or alkenyl radical having from 1 to 20 carbon atoms. This sub-class of compounds may be represented by the formula:

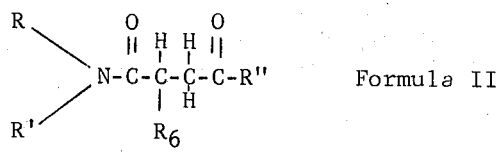  Formula II wherein R is selected from the group consisting of H and alkyl radicals having from 1 to about 18 carbon atoms and alkenyl radicals having from 2 to about 18 carbon atoms, R' is selected from the group consisting of alkyl and radicals having from 1 to about 18 carbon atoms and alkenyl radicals having from 2 to about 18 carbon atoms, and $R_6$ is selected from the group consisting of H, alkyl radicals having from 1 to about 20 carbon atoms and alkenyl atoms having from 2 to about 20 carbon atoms, and R'' has the same meaning as above.

Especially preferred is the configuration wherein R'' is

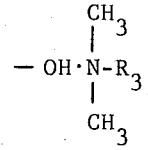

wherein $R_3$ is an alkyl or alkenyl group having from 8 to 22 carbon atoms. It is preferred that $R_3$ be a secondary-alkyl group.

Especially preferred is the above compound wherein $R_6$ is H or dodecenyl and R and R' are alkyl radicals having from 1 to 18 carbon atoms. Specific compounds found to be effective for my invention include dimethyl-cocoammonium-N,N-dimethyl-beta-dodecenyl succinamate, dimethyl-sec-alkyl-($C_{11}$–$C_{14}$)ammonium-N,N-dimethyl beta-dodecenyl-succinamate, dimethyl-cocoammonium-N-methyl-N-dodecyl-beta-dodecenyl succinamate, and dimethyl-cocoammonium-N,N-dimethyl succinamate.

Another preferred sub-class of compounds coming within my invention includes the group of compounds within Formula II above wherein R'' is

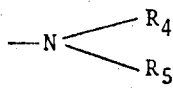

and $R_4$ and $R_5$ are alkyl radicals having from 1 to 18 carbon atoms and alkenyl radicals having from 2 to 18 carbon atoms. Specific exemplary compounds within this sub-class include N-methyl-N-dodecyl-N'-methyl-N'-dodecyl-beta-dodecenyl-succindiamide, N-methyl-N-dodecyl-N',N'-dimethyl-beta-dodecenyl-succindiamide, and N-methyl N-dodecyl-N',N'-dimethyl succindiamide.

The amic acids used to form the compounds of this invention may be produced from the corresponding acid anhydride by reaction with a primary or secondary amine. The anhydride and amine may be heated to 100° to 150°C and the stoichiometic water of reaction removed forming the amic acid. Alternatively, the polycarboxylic acid may be readily formulated by hydrolizing the anhydride with caustic. The anhydride may be refluxed with aqueous sodium hydroxide to form the sodium salt which may be neutralized with concentrated hydrochloric acid and the product acid washed to obtain the polycarboxylic acid. The polycarboxylic acid may then be converted to the amic acid by reaction with a primary or secondary amine at reflux temperatures under nitrogen until the stoichiometric amount of water is removed from the reaction system to result in corresponding amic acid.

The ammonium salts of the acid amides of my invention are readily formed by simple mixing of a tertiary amine of the formula

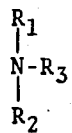

wherein $R_1$ is selected from the group consisting of aliphatic hydrocarbon radicals having from 1 to about 4 carbon atoms, $(CH_2CH_2O)_mH$, and

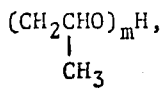

$R_2$ is selected from the group consisting of aliphatic hydrocarbon radicals having from 1 to about 4 carbon atoms, $(CH_2CH_2O)_nH$ and

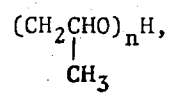

wherein m and n are integers from 1 to about 15, and $R_3$ is an aliphatic hydrocarbon radical having from 8 to 22 carbon atoms; and an acid amide of the formula

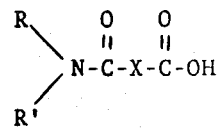

wherein R is selected from the group consisting of H and aliphatic hydrocarbon radicals having from 1 to about 18 carbon atoms, and R' is an aliphatic hydrocarbon radical having from 1 to about 18 carbon atoms; and wherein X is a bivalent aliphatic hydrocarbon radical having from 1 to 22 carbon atoms; in the mole ratio of 1 mole of amine per acid equivalent in the acid amide. The amine and acid amide can be mixed in a common solvent to assure good molecular contact. Warming may be desired to obtain solution, but the salt formation is carried out at temperatures of less than about 100°C. The ammonium salts are readily formed in quantitative stoichiometric amounts.

The di- and tri-amides of this invention may be prepared by mixing a polybasic acid having the formula

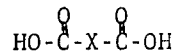

wherein X has the meaning defined for Formula I, or the corresponding acid-amide with a primary or secondary amine having the formula

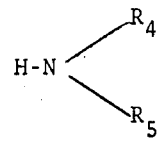

wherein $R_4$ is selected from the group consisting of H and aliphatic hydrocarbon radicals having from 1 to 18 carbon atoms and $R_5$ is an aliphatic hydrocarbon radical having from 1 to 18 carbon atoms, under a nitrogen blanket at a temperature of from about 105° to 150°C with stirring until the water of reaction is driven off. It can be seen that one active acid group may be reacted with one amine and another active acid group with another amine, thereby producing unsymmetrical di- and tri-amides.

In the above formulas the various R groups, when aliphatic hydrocarbon groups, may be saturated, unsaturated, straight-chain, branched-chain, primary-alkyl, secondary-alkyl, and tertiary-alkyl hydrocarbon groups. For example, $R_1$ and $R_2$ includes methyl, ethyl, propyl, butyl, isopropyl, isobutyl; likewise, R, R', $R_4$, $R_5$ and $R_6$, may include methyl, ethyl, propyl, butyl, pentyl, hexyl, heptyl, octyl, nonyl, decyl, hendecyl, dodecyl, tridecyl, tetradecyl, pentadecyl, hexadecyl, heptadecyl, octadecyl, ethenyl, propenyl, butenyl, pentenyl, hexenyl, heptenyl, octenyl, nonenyl, decenyl, hendecenyl, dodecenyl, tridecenyl, tetradecenyl, pentadecenyl, hexadecenyl, heptadecenyl, octadecenyl, and isomeric mixtures of sec-alkyl groups such as sec-alkyl ($C_7$–$C_8$), sec-alkyl ($C_9$–$C_{10}$), sec-alkyl ($C_{11}$–$C_{14}$) and sec-alkyl($C_{15}$–$C_{20}$). $R_3$ includes the above identified hydrocarbon radicals having from 8 to 18 carbon atoms and additionally includes nonadecyl, eicosyl, docosyl, oleyl, linoleyl, palmitoleyl, linolenyl, myristoleyl. The hydrocarbon groups may be derived from natural fats and oils such as coconut, tallow, and may be derived from synthetic sources from petroleum as for example the sec-alkyl groups mentioned above.

X in the above formulas is a bivalent aliphatic hydrocarbon radical which has from 1 to 6 carbon atoms in a chain connecting the two carboxy groups and may be substituted with radicals such as carboxy, hydroxy, and halogen. X includes the derivitives of malonic acid, dimethyl malonic acid, isopropyl malonic acid, butyl malonic acid, n-hexyl malonic acid, succinic acid, methyl succinic acid, alpha methyl succinic acid, alpha ethyl succinic acid, dodecyl succinic acid, hydroxy substituted succinic acid, glutaric acid, beta-methyl glutaric acid, alpha-n-propyl glutaric acid, adipic acid, alpha-ethyl adipic acid, beta dimethyl adipic acid, alpha-n-hexyl adipic acid, pimetic acid, alpha ethyl pimetic acid, suberic acid and substitutions thereof as disclosed above.

I have found the chemicals coming within the above described formulas to be active plant growth regulators and especially effective in application to plants and trees to obtain retardation or stimulation of growth. It is surprising that the chemicals of this invention do show such effective retardation activity in view of the fact that when about 5000 ppm of succinic acid, dodecenyl succinic acid, dimethyl-cocoammonium dodecenyl succinate, N,N-dimethyl-beta-dodecenyl succinamic acid and N-methyl-N-dodecyl-beta-dodecenyl succinamic acid were sprayed, in aqueous emulsions, on young tomato, snap bean, English broad bean, cotton and tobacco plants and no marked dwarfing was observed about four weeks after application.

The plant response is dependent upon the plant species, concentration of chemical and the time of application. In general, the greater concentration of the chemical the more likely is a response of plant retardation or dwarfing. There may be a level at which no response is obtained and then below which there will be a plant stimulatory response. Dwarfing responses may generally be obtained with the higher concentration of chemicals on seedling plants. Stimulatory responses are obtained with chemicals at low level to young seedlings or at higher levels to the more mature plant.

Stimulatory effective amounts of the active chemical and retardancy effective amounts of active chemical, according to this invention, may be readily determined by one skilled in the art in accordance with the effect desired on a particular species of plant by application of the active chemical in a range of amounts to the actively growing plant.

The plant growth regulator chemicals of this invention may be applied in many ways well known to the art to obtain particularly desired results. They may be applied in either oil or aqueous solutions when solubility of the active chemical permits, or as emulsions. Aqueous emulsions may be formed using emulsifiers such as ethoxylated fatty acids, polysorbitanmonlaurate, and the like at concentrations of from about 1 to 4 percent, based upon the total composition.

It is generally most satisfactory for general dwarfing effects to apply the active retardant in the early two or four leaf stage. However, applications at other periods of growth do result in specialized retardation or stimulating functions. For example, the active retardant may be applied at flowering time to retard growth of flower bracts. It is especially effective to apply the growth retardant of this invention to fruit trees from early bud stage to late flowering stage to shorten terminal growth or to retard bud development to obtain dormancy during periods of dangerously low temperatures which would normally produce frosting and crop damage. In certain crops, such as soybeans, application of the chemical at flowering time does produce a stimulating or increased bean set. Another method of application of the growth regulation of my invention is to soak the plant seeds in compositions containing active chemical.

To obtain growth regulatory effects, an amount of the active chemical sufficient to obtain desired effect should be applied in aqueous or oil solutions or emulsions. Any nonphytotoxic agricultural oil may be used. A wide range of quantities are suitable depending upon mode of application and desired effect. Usually from about 50 to 5000 ppm is suitable for spray application. However, it is also appropriate to apply the growth retardant at a higher rate.

When applied by soaking of seeds or bulblets in a solution of active chemical, concentrations of about 5 to 500 ppm are preferred. The seeds or bulblets may be soaked in the active chemical for from ½ to 3 hours.

To maintain dwarfing or stimulation effects over long periods of time, it may be desirable to make multiple applications of the chemical.

The active chemicals of my invention are effective plant growth regulator agents when applied to plants generally including wide varieties of plant life including farm crops, ornamental plants, shrubs, ornamental trees, and fruit trees.

The active chemicals of this invention may be applied in conjunction with other chemicals, such as biocides, other plant growth regulators, chemicals to aid in uptake, translocation of the chemical, and the like. Any non-interferring chemical may be applied with the chemical of this invention.

The following examples are presented to illustrate the present invention.

EXAMPLE I 60.6 gms. of a 25 percent active aqueous solution of dimethyl amine was placed in a reactor and 67.5 gms. of dodecenyl succinic anhydride was added drop-wise with agitation over a one-hour period. A water trap was attached to the reactor, heat applied to the reactor and 47 mls. of water was removed. The first 40 mls. of water was removed at a reactor pot temperature of 100°C and the last 7 mls. of water was removed by raising the pot temperature to 150°C. The product N,N, dimethyl succinamic acid was analyzed and found to have the following analysis:

| Amine Value | 175 | |
|---|---|---|
| Neutral Equivalent | 313 | (Theoretical 311) |

One mole of dimethyl cocoamine and 1 of dimethyl dodecenyl succinamic acid were mixed together and warmed until a clear solution was obtained. When cooled the product obtained was dimethyl cocoammonium N,N-dimethyl dodecenyl succinamate which was a dark amber liquid exhibiting moderate viscosity at 75°F, substantially insoluble in water and soluble in the organic solvents acetone and isopropanol.

In like fashion, the following ammonium salts of acid amides were prepared and exhibited the noted properties as shown in Table I.

Table I

| Product | Color | Viscosity 75°C | Solubility in Water | Solubility in Oil | Solubility in Organic Solvent |
|---|---|---|---|---|---|
| Dimethyl sec-alkyl($C_{11-14}$) ammonium N,N-dimethyl beta-dodecenyl succinamate | Amber | Moderate | Substantially Insoluble | — | Soluble |
| Dimethyl cocoammonium N-methyl-N-dodecyl-beta-dodecyl succinamate | Dark Amber | Heavy | Substantially Insoluble | — | Soluble |
| Dimethyl 1-methyldecyl ammonium N,N-dimethyl succinamate | Light Yellow | Light | Soluble | Substantially Insoluble | Soluble |
| Bis-[ethoxy (5 moles)]sec-alkyl-($C_{11-14}$)-ammonium N,N-dimethyl-beta-dodecenyl succinamate | Amber | Moderate | Substantially Insoluble | Soluble | Soluble |
| Bis-[ethoxy (5 moles)]-soya ammonium N,N-dimethyl beta-dodecenyl succinamate | Light Amber | Moderate | Dispersable | — | Soluble |
| Dimethyl cocoammonium N,N-dimethyl-succinamate | Light Yellow | Light | Soluble | Substantially Insoluble | Soluble |
| Dimethyl N-sec-alkyl ($C_{11-14}$) N,N-dimethyl ammonium succinamate | Light Yellow | Light | Soluble | Slightly Insoluble | Soluble |

EXAMPLE II

Two moles of methyl dodecyl amine were mixed with dodecenyl succinic acid and heated under a nitrogen blanket at a temperature of about 130°C with stirring until about 2 moles of water of reaction were collected. The product was bis-(methyl, dodecyl) beta-dodecenyl succindiamide which was a light amber liquid exhibiting moderate viscosity at 75°F, substantially insoluble in water and soluble in the organic solvents acetone and isopropanol.

Table II

| Product | Color | Viscosity 75°C | Solubility in Water | Solubility in Oil | Solubility in Organic Solvent |
|---|---|---|---|---|---|
| N-N-dimethyl N'-1-methyloctyl beta-dodecenyl succindiamide | Amber | Moderate | Dispersable | — | Soluble |
| N,N-dimethyl N'-1-methyldecyl beta-dodecenyl succindiamide | Amber | Moderate | Substantially Insoluble | — | Soluble |
| Bis(1-methyloctyl) beta-dodecenyl succindiamide | Amber | Heavy | Substantialy Insoluble | Substantially Insoluble | Soluble |
| Bis-(1-methyldodecyl)beta-dodecenyl succindiamide | Amber | Heavy | Substantially Insoluble | Substantially Insoluble | Soluble |
| N,N-dimethyl N'-methyldecyl malediamide (maleic acid) | Amber | Moderate | Substantially Insoluble | — | Soluble |
| N,N-dimethyl N'-methyldecyl malidiamide (malic acid) | Amber | Moderate | Substantially Insoluble | — | Soluble |
| N,N-dimethyl N'-methyldecyl malondiamide (malonic acid) | Light Amber | Moderate | Soluble | — | Soluble |
| N,N-dimethyl-N'-methyldecyl citric diamide | Dark Amber | Moderate | Slightly Soluble | — | Soluble |
| N,N,N',N'-tetramethyl N''-1-methyldecyl citric triamide | Amber | Heavy | Soluble | — | Soluble |

EXAMPLE III

Potted young seedlings of flax were sprayed to the point of runoff with 10 ml of aqueous emulsions of the noted chemicals, emulsified with 2 percent polysorbate monolaurate, and the plant response noted in Table III was observed 10 days after application of the chemical.

TABLE III

| CHEMICAL | CONC. PPM | PLANT RESPONSE |
|---|---|---|
| No treatment | — | Healthy growth |
| N,N-dimethyl beta-dodecenyl succinamic acid | 1000 | No effect |
| Dimethylcoco ammonium N,N-dimethyl beta-dodecenyl succinamate | 1000 | Dwarfed* |
| Dimethyl sec-alkyl $C_{11}$-$C_{14}$ ammonium N,N-dimethyl beta-dodecenyl succinamate | 1000 | Dwarfed |

* Throughout the Examples the term "dwarfed" means approximately ½ or less the size of the control.

EXAMPLE IV

Young plants noted in Table IV were sprayed in the two to four leaf stage with aqueous solutions or emulsions of dimethylcoco ammonium N,N-dimethyl beta-dodecenyl succinamate in the noted concentrations to the point of runoff. Generally 2 mls of spray were required. The plants were compared with unsprayed controls 4 weeks after being sprayed with the noted chemicals. The plant response and phytotoxicity is noted in Table IV.

Table IV

| PLANT | CONC. (PPM) | PHYTOTOXICITY | PLANT RESPONSE |
|---|---|---|---|
| Flax | 1000 | Slight | Dwarfed |
| Wheat | 1000 | Slight | Dwarfed |
| Tobacco | 1000 | None | Dwarfed |
|  | 500 | None | Partially Dwarfed* |
| Broad bean | 1000 | None | Slight effect |
| Potato | 5000 | Light | Dwarfed |

*Throughout the Examples the term "partially dwarfed" means approximately ¾ the size of the control.

EXAMPLE V

Young plants noted in Table V were sprayed in the same fashion as described Example IV using aqueous emulsions of dimethyl sec-alkyl $C_{11}$–$C_{14}$ ammonium N,N-dimethyl beta-dodecenyl succinamate. The plant response and phytotoxicity observed four weeks post spraying is shown in Table V.

Table V

| PLANT | CONC. (PPM) | PHYTOTOXICITY | PLANT RESPONSE |
|---|---|---|---|
| Flax | 1000 | Light | Dwarfed |
| Wheat | 1000 | Light | Dwarfed |
| Tobacco | 1000 | Light | Dwarfed |
|  | 500 | Slight | Leaves small |
| Tomato | 5000 | Light | Partially dwarfed |
| Broad bean | 5000 | Moderate | Dwarfed |
|  | 2500 | Light | Dwarfed |
| Potato | 5000 | Moderate | Dwarfed |
| Peanut | 5000 | Light | Dwarfed |
| Green bean | 2500 | Moderate | Dwarfed |
|  | 1250 | Moderate | Dwarfed |

EXAMPLE VI

Green bean plants were sprayed with aqueous solutions or emulsions of 1250 ppm of dimethyl sec-alkyl($C_{11}$–$C_{14}$)ammonium N,N-dimethyl beta-dodecenyl succinamate and 1250 ppm of methylheptyl sulfoxide. The sulfoxide aids in the uptake and translocation of chemicals in the plant. The solution of chemicals was sprayed on green beans at a combined total concentration of 2500 ppm. After 4 weeks, the plants showed moderate phytotoxicity and an extreme dwarfing effect.

EXAMPLE VII

Young plants were sprayed as described in Example IV with aqueous solutions or emulsions of dimethyl cocoammonium N-methyl N-dodecyl beta-dodecenyl succinamate. Four weeks after spraying, the plant response and phytotoxicity was observed as noted in Table VI.

Table VI

| PLANT | CONC. (PPM) | PHYTOTOXICITY | PLANT RESPONSE |
|---|---|---|---|
| Tomato | 5000 | Moderate | Dwarfed |
|  | 1000 | None | No effect |
| Tobacco | 5000 | Slight | Partially dwarfed |
|  | 1000 | None | Leaves Smaller |
| Green bean | 5000 | None to Slight | Very dwarfed |
|  | 2500 | None | Dwarfed |
| Broad bean | 5000 | None | Dwarfed |
|  | 2500 | None | Dwarfed |
| Cotton | 5000 | Light | Dwarfed |

EXAMPLE VIII

Young plants were sprayed as described in Example IV with a solution of N-methyl-N-dodecyl-N'-methyl N'-dodecyl beta-dodecenyl succindiamide and the plant response and phytotoxicity observed four weeks after spraying is noted in Table VII.

Table VII

| PLANT | CONC. (PPM) | PHYTOTOXICITY | PLANT RESPONSE |
|---|---|---|---|
| Tomato | 5000 | Moderate | Dwarfed |
|  | 1000 | None | Dwarfed |
| Tobacco | 5000 | Slight | Dwarfed |
|  | 1000 | None | No effect |
| Green bean | 2500 | Slight | Dwarfed |
| Cotton | 5000 | Light | Dwarfed |
| Broad bean | 5000 | Light | Dwarfed |
|  | 2500 | Slight | Normal |
| Potato | 5000 | Slight | Dwarfed for two weeks |

EXAMPLE IX

Young green bean plants were sprayed with concentrations of 2500 ppm of the same chemical described in Example VIII and 2500 ppm of gibberellin was applied in the same spray application, 24 hours after and 24 hours prior to application of the diamide. Results are shown in Table VIII.

Table VIII

| MODE OF APPLICATION | PHYTOTOXICITY | PLANT RESPONSE |
|---|---|---|
| Diamide and gibberellin together | None | Gibberellin effect |
| Diamide alone followed by gibberellin 24 hrs. later | None | Held dwarf 2 weeks and Gibberellin effect occurred |
| Gibberellin alone followed by diamide | None | Dwarfed for at least one month |

EXAMPLE X

Green bean plants were sprayed with aqueous emulsions, as described in Example IV, of ethoxylated 5 moles sec-alkyl($C_{11}$–$C_{14}$)ammonium N,N-dimethyl beta-dodecenyl succinamate at a concentration of 5000 ppm of active chemical. Four weeks following application, the plants showed no evidence of phytotoxicity and were dwarfed.

EXAMPLE XI

Young peanut plants were sprayed with the noted chemicals at a concentration of 5000 ppm of the active chemical. Observations four weeks past spraying showed the results noted in Table IX.

Table IX

| CHEMICAL | PHYTOTOXICITY | RESPONSE |
| --- | --- | --- |
| N-methyl N-1-methyloctyl-N',N'-dimethyl-beta-dodecenyl succindiamide | None | Dwarfed |
| Dimethyl coco ammonium N,N-dimethyl succinamate | Light | Dwarfed |

EXAMPLE XII

Potted young active growing flowers were sprayed to the point of run-off with aqueous emulsions of the noted chemicals emulsified with 2 percent polysorbate monolaurate, and the plant response noted in Table X was observed 68 days after application of the chemical.

EXAMPLE XIII

Young peanut plants, in a green house test, were sprayed to the point of run-off with aqueous emulsions of the noted chemicals emulsified with 2 percent polysorbate monolaurate, and the plant response noted in Table XI was observed 59 days after application of the chemical by comparison with untreated controls.

At the time of observation all the treated plants were bushier and had more flowers than the untreated controls.

EXAMPLE XIV

Young Belladonna plants, strain No. 49, in a green house test, were sprayed to the point of run-off with aqueous emulsions of the noted chemicals emulsified with 2 percent polysorbate monolaurate, and the plant response noted in Table XII a & b, was observed 28 days after application of the chemical by comparison with untreated controls.

TABLE X

| PLANT | CHEMICAL | CONC. (PPM) | PLANT RESPONSE |
| --- | --- | --- | --- |
| Forget-Me-Not | Bis(1-methyloctyl)-dodecenyl succindiamide | 1,000 | 25% taller than control |
| | | 2,500 | Approx. 25% taller than control |
| Forget-Me-Not | Bis(1-methyldecyl)-dodecenyl succindiamide | 1,000 | Same as control |
| | | 2,500 | Approx. twice as tall as control |
| Forget-Me-Not | Dimethyl cocoammonium N,N-dimethyl dodecenyl succinamate | 1,000 | Approx. 25% taller than control |
| | | 2,500 | Same as control (At 17 days plant appeared to be about 50% smaller than control) |
| Zinnia | Bis(1-methyloctyl)-dodecenyl succindiamide | 1,000 | Slightly smaller than control |
| | | 2,500 | 25% taller than control |
| Zinnia | Bis(1-methyldecyl)-dodecenyl succindiamide | 1,000 | Same as control |
| | | 2,500 | Approx. 25% taller than control |

TABLE XI

| CHEMICAL | CONC. (PPM) | PLANT RESPONSE |
| --- | --- | --- |
| Bis(1-methyloctyl)-dodecenyl succindiamide | 5,000 | Approx. 25% taller than control |
| Bis (1-methyldecyl)-dodecenyl succindiamide | 5,000 | Approx. 25% taller than control |
| Dimethyl cocoammonium N,N-dimethyl dodecenyl succinamate | 5,000 | Similar height and bushier than control |
| Dimethyl sec-alkyl ($C_{11-14}$) ammonium N,N-dimethyl dodecenyl succinamate | 5,000 | Similar height and bushier than control |

TABLE XIIa

| CHEMICAL | CONC. (PPM) | PLANT RESPONSE |
| --- | --- | --- |
| Bis(1-methyloctyl)-dodecenyl succindiamide | 5,000 | Leaves about 15 to 20% larger in area than control |
| Bis(1-methyldecyl)-dodecenyl succindiamide | 5,000 | Leaves about 40% larger in area than control |

TABLE XIIb

| CHEMICAL | CONC. (PPM) | Main Stem cm. | Green Stem wt. gm. | Main Leaves No. | Main Leaves Wt.gm. | Secondary Lvs. No. | Secondary Lvs. Wt.gm. | Total Green Wt. gm |
|---|---|---|---|---|---|---|---|---|
| N,N dimethyl-N'1-methyldecyl fumaric diamide | 5,000 | 49.0 | 23 | 27 | 86 | 24 | 8 | 117 |
| N,N'bis(1-methyldecyl) maleic diamide | 5,000 | 47.0 | 20 | 28 | 76 | 8 | 1 | 97 |
| N,N'bis(1-methyldecyl) citric diamide | 5,000 | 50.5 | 21 | 28 | 81 | 4 | 0.5 | 102 |
| No treatment | 5,000 | 42.0 | 15.0 | 27 | 69 | 12 | 8 | 92 |

EXAMPLE XV

Six Flue Tobacco seedling transplants about ½ inch tall were sprayed to the point of run-off with 5 ml. of aqueous emulsions of the noted chemicals emulsified with 2 percent polysorbate monolaurate, in green house tests, and the plant response noted in Table XIII was observed 113 days after application of the chemical by comparison with untreated controls.

TABLE XIII

| CHEMICAL | CONC. (PPM) | PLANT RESPONSE |
|---|---|---|
| No Treatment | — | 5.6" |
| Bis(1-methyloctyl)-dodecenyl succindiamide | 1,000 | 6.2" |
| Bis(1-methyldecyl)-dodecenyl succindiamide | 1,000 | 6.9" |

EXAMPLE XVI

Young English Broad Bean plants were sprayed to the point of run-off with 1 ml. per plant of aqueous emulsions of the noted chemicals emulsified with 2 percent polysorbate monolaurate, in green house tests, and the plant response noted in Table XIV was observed 23 days after spraying.

TABLE XIV

| CHEMICAL | CONC. (PPM) | PLANT RESPONSE |
|---|---|---|
| Bis(1-methyloctyl)-dodecenyl succindiamide | 1,000 | Approx. 25% taller than control |
| Bis(1-methyldecyl)-dodecenyl succindiamide | 1,000 | Approx. 25% taller than control |

EXAMPLE XVII

Flue tobacco plants approximately 6 to 10 inches tall were sprayed to the point of run-off with aqueous emulsions of the noted chemicals, emulsified with 2 percent polysorbate monolaurate, and the 7th, 10th, and 13th leaves were harvested 73 days after spraying and the weights of the primed leaves were as noted in Table XV.

Table XV

| CHEMICAL | CONC. PPM | 7th | 10th | 13th | Total |
|---|---|---|---|---|---|
| No treatment | — | 14.0 | 17.5 | 19.9 | 51.4 |
| Bis(1-methyl-octyl)dodecenyl succindiamide | 1000 | 14.3 | 22.2 | 16.1 | 52.6 |
| Bis(1-methyl-decyl)dodecenyl succindiamide | 1000 | 13.1 | 20.8 | 21.0 | 54.9 |

EXAMPLE XVIII

Onion sets were divided into groups of ten onion sets each and four replicates using 40 onion sets were subjected to each of the following treatments. Aqueous solutions of the noted chemicals were prepared and the onion sets were soaked therein for a period of 30 minutes following which the onion sets were planted. The soaked onion sets were harvested 69 days after soaking and planting with the following results:

Table XVI

| CHEMICAL | CONC. PPM | Average wt. per Onion in grams |
|---|---|---|
| Control, water soak | — | 91.9 |
| Bis(1-methyloctyl) dodecenyl succindiamide | 50 | 96.6 |
| Bis(1-methyloctyl) dodecenyl succindiamide | 500 | 100.8 |
| Bis(1-methyloctyl) dodecenyl succindiamide | 1000 | 102.2 |
| Bis(1-methyldecyl) dodecenyl succindiamide | 50 | 107.6 |
| Bis(1-methyldecyl) dodecenyl succindiamide | 500 | 103.9 |
| Bis(1-methyldecyl) dodecenyl succindiamide | 1000 | 95.2 |

Non-treated onion sets were planted in soil for later spray treatment at the same time the soaked onion sets were planted. Nineteen days after planting, when the sets had foliage, random blocks of 40 onion plants each were sprayed with aqueous emulsions of the noted chemical and the response 50 days after spraying was observed as in Table XVII.

Table XVII

| CHEMICAL | CONC. PPM | Average wt. per Onion in grams |
|---|---|---|
| Control, no treatment | — | 51.3 |
| Bis(1-methyloctyl) dodecenyl succindiamide | 50 | 52.1 |
| Bis(1-methyloctyl) dodecenyl succindiamide | 500 | 56.2 |
| Bis(1-methyloctyl) dodecenyl succindiamide | 1000 | 55.5 |

EXAMPLE XIX

Soybeans in the first trifoliate stage were sprayed with aqueous solutions of the noted chemical at the rate of 0.5 pounds active chemical per acre and maintained in the greenhouse under 16 hours daylight Grow-Lux lights. The plants were observed after 102 days and showed the following results:

Table XVIII

| CHEMICAL | Number Pods | Beans | Pod & Bean Wt. in grams |
|---|---|---|---|
| Control, no treatment | 5 | 11 | 1.17 |
| N,N-dipropyl-1-methyldecyl succindiamide | 15 | 30 | 16.49 |
| Bis(N-methyl-N-dodecyl)dodecenyl succindiamide | 15 | 36 | 13.44 |
| Bis(1-methyldodecyl)-dibromo succindiamide | 16 | 32 | 9.54 |
| Bis(N-methyl-N-dodecyl)dibromo succindiamide | 13 | 26 | 7.92 |
| Bis(1-methyloctyl)dodecenyl succindiamide | 9 | 15 | 3.09 |
| Bis(1-methyldecyl)dodecenyl succindiamide | 10 | 17 | 2.74 |

EXAMPLE XX

Ten red Delicious apple trees, Starkimson variety, at the second leaf stage were sprayed with Bis(1-methyloctyl) dodecenyl succindiamide at 5,000 parts per million in an aqueous emulsion in early June. One month later a slight chlorosis was noted in the treated trees. The treated trees were compared with untreated control trees five months after spraying and the following measurements were taken.

Table XIX

| Treatment | CONC. PPM | Averg. Trunk Dia.mm | No. Lateral Branches/Tree | Spurs per Tree |
|---|---|---|---|---|
| Check, no treatment | — | 31.7 | 13.0 | 22.6 |
| Bis(1-methyloctyl)dodecenyl succindiamide | 5,000 | 31.9 | 16.7 | 11.1 |

The above observations show good stimulatory effects in that more lateral branches were produced on the treated trees than on the untreated trees.

EXAMPLE XXI

Tetrachlorothiophene has been used as a soil fumigant for the control of various nematodes prior to planting of plants. Tobacco plants have been affected by the pretreatment of soil with tetrachlorothiophene causing dwarfing and lower tobacco yield. Application of plant regulatory agents of this invention in stimulating amounts to flue tobacco plants planted in soil pretreated with tetrachlorothiophene, caused the plants to grow normally. The aqueous emulsion spray application of plant regulatory agents of this invention stilulated tobacco growth within normal ranges, thus providing increased tobacco yields from tetrachlorothiphene treated soil wherein the tobacco plants were sprayed with the noted chemical at about one week after transplant, as shown in Table XX.

Table XX

| Treatment | RATE/A | Growth Rating* | Greenness Rating** | Number of Nematodes 150 cc Soil Total | Meloidogyne | Root Gall Index*** | Yield No. Green Plot | Wt. Cured A |
|---|---|---|---|---|---|---|---|---|
| Control (no treat.) | — | 2.3 | 2.3 | 400 | 30 | 4.3 | 24 | 1200 |
| Tetrachloro-thiophene (pre-planting) | 3 lbs. | 2.7 | 2.2 | 302 | 0 | 3.1 | 24 | 1167 |
| Tetrachloro-thiophene (pre-planting) Bis(1-methyloctyl) dodecenyl succindiamide (post planting) | 3 lbs. 2 lbs. | 3.2 | 3.2 | 387 | 0 | 2.9 | 30 | 1460 |
| Tetrachloro-thiophene (pre-planting) Bis(1-methyldecyl)-dodecenyl succindiamide (post planting) | 3 lbs. 2 lbs. | 3.5 | 3.3 | 712 | 0 | 3.3 | 35 | 1700 |

* 1 poor, 5 excellent
** 1 yellow, 5 dark green
*** 1 no galls, 5 maximum

EXAMPLE XXII

Aqueous emulsions of Bis(1-methyloctyl)-dodecenyl succindiamide were applied in aqueous sprays at 1,500 and 3,000 ppm (1-½ and 3 lbs. per acre) to greenhouse pots of wheat previously treated with various levels of nitrogen fertilizer. The spray application was made just as the seed head was differentiating about 80 days after planting. Computer analysis of the resulting data showed yield increases are highly significant and a correlation between fertilization and the application of Bis(1-methyloctyl)dodecenyl succindiamide, as shown in Table XXI.

Table XXI

| Lbs. Nitrogen appl/plot | 166 Variety Wheat Chemical Applied | | | | | SC Variety Wheat Chemical Applied | | |
|---|---|---|---|---|---|---|---|---|
| | O | 1500 ppm | 3000 ppm | X | O | 1500 ppm | 3000 ppm | X |
| YIELD, GRAMS | | | | | | | | |
| 0 | 5.0 | 5.6 | 6.4 | 5.6 | 4.5 | 4.6 | 5.8 | 5.0 |
| 1.5 | 19.2 | 19.7 | 17.6 | 18.8** | 14.8 | 16.9 | 15.5 | 15.7** |
| 3.0 | 20.6 | 24.0 | 23.6 | 22.7** | 22.7 | 26.1 | 24.2 | 24.3** |
| STEM LENGTH, MM | | | | | | | | |
| 0 | 561 | 522 | 542 | 542 | 586 | 609 | 641 | 612 |
| 1.5 | 525 | 553 | 529 | 536 | 679 | 696 | 742 | 706 |
| 3.0 | 528 | 565 | 623 | 572** | 687 | 714 | 730 | 677 |
| SPIKE BEARING STEMS | | | | | | | | |
| 0 | 3.5 | 4.0 | 4.0 | 3.8** | 4.2 | 4.2 | 5.0 | 4.5** |
| 1.5 | 10.2 | 10.2 | 10.5 | 10.3** | 12.8 | 13.8 | 13.2 | 13.2** |
| 3.0 | 15.2 | 14.0 | 14.8 | 14.7** | 16.2 | 18.0 | 16.8 | 17.0** |
| SEED, NO/POT | | | | | | | | |
| 0 | 143.2 | 164.5 | 204.2 | 170.7* | 126.5 | 145.5 | 219. | 168.8 |
| 1.5 | 483.8 | 508.2 | 530.8 | 507.6* | 389.5 | 462.2 | 457.5 | 436.4 |
| 3.0 | 462.0 | 549.8 | 616.2 | 542.7* | 490.0 | 644.2 | 635.0 | 589.8 |

* Significant at 1% level
** Significant at 5% level

EXAMPLE XXIII

Large scale plots on rice treated with Bis(1-methyldecyl)-dodecenyl succindiamide show a striking visual difference prior to harvest. These differences are shown in increased yields of the number of spike bearing stems and greater seed size.

EXAMPLE XXIV

Potted young active growing Forget-Me-Nots were sprayed to the point of run-off with emulsions of the noted chemicals emulsified with 2 percent polysorbate monolaurate, and the plant response noted in Table XXII was observed at 17 days and at 68 days after application of chemicals.

EXAMPLE XXV

Potted Califonia Wonder pepper plant seedlings were sprayed to the point of run-off with aqueous emulsions of the noted chemicals and the plant response noted in Table XXIII was observed 47 days after application.

TABLE XXIII

| CHEMICAL | CONC. (PPM) | PLANT RESPONSE |
|---|---|---|
| Dimethyl cocoammonium N,N-dimethyl dodecenyl succinamate | 5,000 | Approx. 50% taller than control (larger leaves and flowers than control and 6 pepper buds as compared with no buds on control) |
| Dimethyl sec-($C_{11-14}$) N,N-dimethyl dodecenyl succinamate | 5,000 | Approx. 50% taller than control (larger leaves and flowers than control and 6 pepper buds as compared with no buds on control) |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably with-

TABLE XXII

| CHEMICAL | CONC. (PPM) | PLANT RESPONSE 17 days | 68 days |
|---|---|---|---|
| Dimethyl cocoammonium salt of N,N-dimethyl-dodecyl succinamic acid | 1,000 | Approx.25% taller than control | Approx.25% taller than control |
| | 2,500 | Approx. 50% shorter than control | Same as control |

I claim:
1. A compound of the formula:

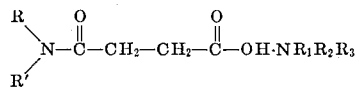

wherein R is a member of the group consisting of H and alkyl having 1 to 18 carbon atoms;
R' is alkyl having 1 to 18 carbon atoms;
$R_1$ and $R_2$ are each a member of the group consisting of alkyl having 1 to 4 carbon atoms, $(CH_2CH_2O)_m H$, and $(CH_2\underset{CH_3}{C}HO)_n H$, in which $m$ and $n$ are integers from 1 to 15; and
$R_3$ is alkyl having 8 to 22 carbon atoms.

2. Dimethyl 1-methyldecyl ammonium N,N-dimethyl succinamate.

3. Dimethyl-cocoammonium N,N-dimethyl succinamate.

4. Dimethyl N-sec-alkyl ($C_{11}$–$C_{14}$) N,N-dimethyl ammonium succinamate.

* * * * *